(12) United States Patent  
Scott

(10) Patent No.: US 7,390,217 B2  
(45) Date of Patent: Jun. 24, 2008

(54) SOLID CONSTRUCTION ELECTRICAL CONNECTOR ADAPTED FOR USE WITH SEISMIC DATA ACQUISITION SYSTEMS

(75) Inventor: Gary Lee Scott, Richmond, TX (US)

(73) Assignee: PGS Americas, Inc., Houston, TX (US)

( * ) Notice: Subject to any disclaimer, the term of this patent is extended or adjusted under 35 U.S.C. 154(b) by 0 days.

(21) Appl. No.: 11/081,475

(22) Filed: Mar. 16, 2005

(65) Prior Publication Data

US 2006/0211305 A1    Sep. 21, 2006

(51) Int. Cl.  
*H01R 13/58* (2006.01)

(52) U.S. Cl. ........................................ 439/604; 439/936

(58) Field of Classification Search ................ 439/452, 439/604, 936; 174/76  
See application file for complete search history.

(56) References Cited

U.S. PATENT DOCUMENTS

| | | | | |
|---|---|---|---|---|
| 1,496,632 A | * | 6/1924 | Herbst | 174/65 R |
| 3,487,353 A | * | 12/1969 | Massa | 439/281 |
| 3,634,806 A | * | 1/1972 | Fergusson | 439/497 |
| 3,857,996 A | * | 12/1974 | Hansen et al. | 174/113 R |
| 4,626,721 A | * | 12/1986 | Ouchi | 310/71 |
| 4,701,014 A | * | 10/1987 | Bonicel | 385/92 |
| 4,818,060 A | * | 4/1989 | Arroyo | 385/103 |
| 5,403,977 A | * | 4/1995 | Steptoe et al. | 174/77 R |
| 5,471,436 A | * | 11/1995 | Harvey | 367/154 |
| 5,724,730 A | * | 3/1998 | Tanaka | 29/868 |
| 6,142,805 A | * | 11/2000 | Gray et al. | 439/206 |
| 6,482,036 B1 | * | 11/2002 | Broussard | 439/606 |
| 6,786,297 B1 | | 9/2004 | Menard | |
| 6,957,970 B2 | * | 10/2005 | Weigel et al. | 439/320 |

\* cited by examiner

*Primary Examiner*—Thanh-Tam T Le  
(74) *Attorney, Agent, or Firm*—E. Eugene Thigpen; Richard A. Fagin

(57) ABSTRACT

A connector for a seismic data acquisition cable includes a molded plastic connector body. The connector body has inserted therein at least one electrical contact for mating with a corresponding electrical contact. The connector body has an internal opening for receiving an electrical cable. The connector body has a mating surface adapted to contact a corresponding connected structure. The internal opening is filled with a curable compound which upon cure forms a substantially interface free bond with the connector body and an external jacket of the electrical cable.

9 Claims, 4 Drawing Sheets

SOLID CONSTRUCTION ELECTRICAL CONNECTOR ADAPTED FOR USE WITH SEISMIC DATA ACQUISITION SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF INVENTION

1. Field of the Invention

The invention relates generally to the field of electrical connectors. More particularly, the invention relates to electrical connectors used to terminate electrical cables used with seismic data acquisition systems.

2. Background Art

Seismic data acquisition systems known in the art include various types of seismic sensors, such as single component geophones, multi-component geophones, accelerometers, and other sensing devices, disposed at spaced apart positions along a cable. The cable typically includes a number of insulated electrical conductors that carry electrical signals from the seismic sensors to various signal processing and telemetry devices that may be interconnected at selected positions along such cables. The electrical conductors may also carry electrical power to the signal processing and telemetry devices.

In some seismic data acquisition systems, the signal processing and telemetry devices may be disposed in modules that are adapted to be coupled to electrical connectors. Such electrical connectors are typically affixed to the ends of sections of such cables. Typical seismic data acquisition systems are designed to enable a number of different user selected configurations of such cables and signal processing/telemetry modules by appropriate coupling of cable sections to the processing/telemetry modules.

Cable sections typically terminate in electrical connectors that include electrical contacts for providing an electrically conductive path from the conductors in the cables to corresponding, mating contacts in the modules and ultimately to various circuits in the modules. The electrical connectors may also include various devices to transmit axial stress from the cable sections to the modules. Finally, the electrical connectors may include various devices to exclude fluid from entering into the modules or into the cable sections when the connectors are mated to the modules. Fluid excluding devices can provide the seismic data acquisition system with the capacity to be used on land in relatively humid environments, and with appropriate configurations of modules, to be used in relatively shallow water.

The electrical connectors are typically made from a molded housing or shell, which may include electrical contact pins molded into an exterior connection portion thereof for mating to a corresponding connector on the module. The connectors known in the art also include some type of device to couple a strength member in the cable to a mechanical load bearing portion of the connector. Finally, the connectors known in the art include some form of cover or other barrier to enclose an interior chamber inside the shell. Electrical connections are typically made within this interior chamber between the conductors in the cable and the electrical contact pins molded into the connector housing. The chamber is typically enclosed by the cover after electrical connection is made between the conductors and the contact pins, however, upon enclosure, the chamber remains substantially filled with air.

It has been observed that the existence of the air-filled chamber makes connectors known in the art susceptible to the need for frequent repair, because the cover may be susceptible to leakage. Leakage may enable water intrusion into the chamber if the data acquisition system is used in water, or moisture intrusion and condensation if the system is used in humid environments on land. In either case, moisture inside the chamber may cause failure of the insulation between the conductors, thus causing disruption of operation of the seismic data acquisition system. Still further, water intrusion into the connector chamber, such as may occur if the connector is submerged and becomes uncoupled from a module, may result in water intrusion into the interior of the cable itself, making it necessary to replace the intruded cable.

It is desirable to have a connector for use with seismic data acquisition systems that is better suited to exclude moisture from the interior of the connector, and to exclude water from entering the cable in the event of failure of the connector to seal or remain engaged with a mating housing.

SUMMARY OF INVENTION

One aspect of the invention is a connector for a seismic data acquisition cable. The connector includes a molded plastic connector body. The connector body has inserted therein at least one electrical contact for mating with a corresponding electrical contact. The connector body has an internal opening for receiving an electrical cable. The connector body has a mating surface adapted to contact a corresponding connected structure. The internal opening is filled with a curable compound which, upon cure, forms a substantially interface free bond with the connector body and an external jacket of the electrical cable.

Another aspect of the invention is a seismic data acquisition system. The system according to this aspect of the invention includes a plurality of cable sections. Each cable section has a cable having a strength member and a plurality of insulated electrical conductors disposed inside a jacket. A connector disposed at each end of each cable section includes a molded plastic connector body. The connector body has inserted therein electrical contacts each for mating with a corresponding electrical contact. The connector body has an internal opening for receiving one end of a cable section. The connector body has a mating surface adapted to contact a corresponding connected structure. The internal opening is filled with a curable compound which upon cure forms a substantially interface free bond with the connector body and the jacket of the cable section. The system includes a plurality of modules, each of which is disposed in a housing. Each housing has at least one surface adapted to mate with the mating surface of one of the connectors. Each module has electrical contacts adapted to mate with the electrical contacts in one of the connectors. Each module has within its housing at least one of a seismic sensor and seismic signal processing circuits.

Another aspect of the invention is connector and cable combination. A combination according to this aspect includes a molded plastic connector body. The connector body has inserted into it at least one electrical or optical contact for mating with a corresponding electrical or optical contact. The connector body has an internal opening for receiving an electrical and/or optical cable therein. The connector body also has a mating surface adapted to contact a corresponding connected structure. The combination includes an electrical and/or optical cable disposed inside the internal opening. The cable has at least one insulated electrical conductor or at least one optical fiber, and a jacket disposed externally to the insulated electrical conductor or optical fiber. A composition of the jacket and a composition of the connector body are selected such that the jacket and the connector body form a substantially interface free bond to a curable potting compound upon cure of the potting compound. The curable potting compound fills the internal opening after insertion of the cable therein and after making contact between the insulated electrical conductor or optical fiber and the electrical or optical contact.

Other aspects and advantages of the invention will be apparent from the following description and the appended claims.

DETAILED DESCRIPTION

Figure 1:
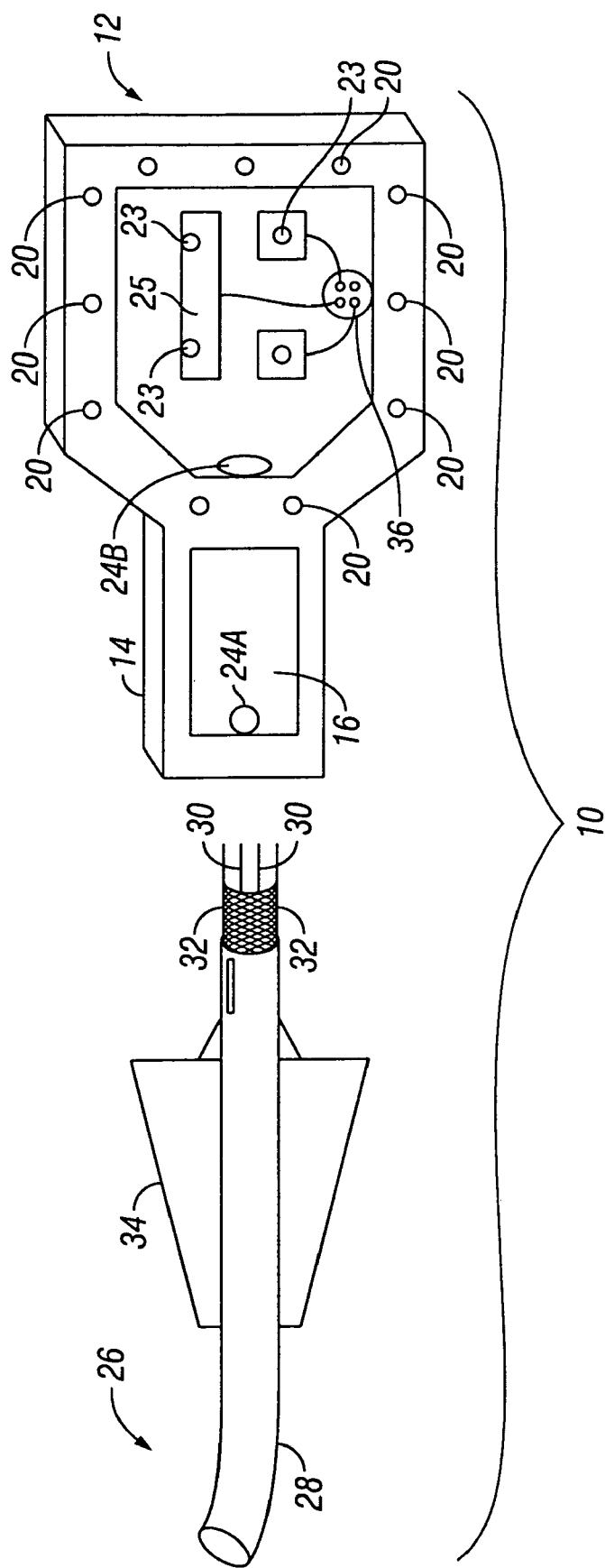
FIG. 1 shows an exploded view of example embodiment of a connector and a cable for coupling thereto according to the invention.

FIG. 1 shows one embodiment of an electrical connector according to the invention in exploded view, along with an electrical cable to be coupled thereto. The connector and the cable to be assembled, shown generally at 10, include connector 12 and an electrical cable 26 having at least one, and typically a plurality of, insulated electrical conductors 30 disposed within an outer, impermeable jacket 28. In other embodiments, the cable 26 may include one or more optical fibers. The jacket 28 can be made from a thermoplastic polyurethane material such as the compound sold under the trademark ESTANE, which is a registered trademark of B.F. Goodrich Company, 9921 Brecksville Road, Cleveland, Ohio 44141. The particular compound used for the jacket 28 is only one example of materials that may be used for the jacket 28. In a preferred embodiment the jacket 28 material is a material that forms what is essentially a molecular or interface-free bond with a curable potting compound that is used to fill interior void space inside a connector housing 14, as will be further explained.

The cable 26 may include a strength member 32, which in the present embodiment may be a woven fiber braid, such as may be formed from glass fiber, polymer fiber, carbon fiber, or combinations thereof The strength member 32 is typically disposed externally to the insulated electrical conductors 30 (or optical fiber) and is typically disposed internally to the jacket 28. Near the end of the cable 26 to be coupled to the connector 12, a bend transition device 34 may be molded onto the jacket 28 or may be separately affixed to the exterior of the jacket 28. The bend transition device 34 serves to provide a gradual change in bend stiffness between connector housing 14 and the cable 26 to reduce the possibility of pinching the conductors 30 (or optical fiber) under bending stress at the interface between the cable 26 and the connector 12. The bend transition device 34 may be molded from the same material used to form the jacket 28.

The connector housing 14 may be molded in a selected shape. The connector housing 14 in the present embodiment may be molded from a thermoplastic polyurethane material such as the compound sold under the trademark ESTALOC, which is a registered trademark of Noveon IP Holdings Corp., 9911 Brecksville Road, Cleveland Ohio 44141. As is the case for the cable jacket 28, the connector housing 14 material can be formed from a compound that forms essentially a molecular or interface-free bond with a curable potting compound that is used to fill the interior spaces 16, 18 in the connector housing 14.

Figure 1A:
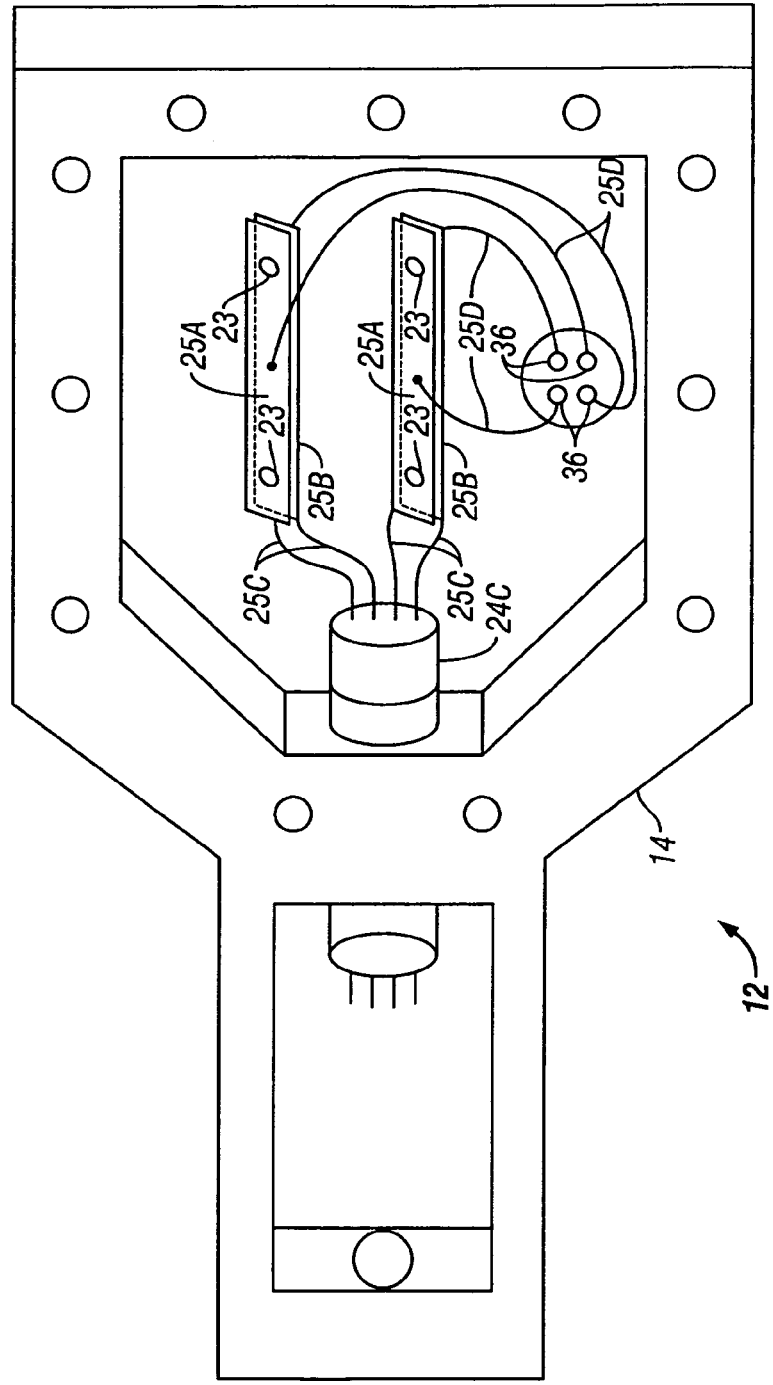
FIG. 1A shows an expanded view of internal components of a connector.

As shown in FIG. 1, and in the more detailed drawing in FIG. 1A, the connector housing 14 may include opening 24A, through which the entire cable 26 may be inserted. The strength member 32 may be exposed within interior space 16 such that subsequent insertion of, and curing of the potting compound will effectively tightly bond the strength member 32 to the connector housing 14, thus enabling transfer of axial stress from the cable 26 to the connector 12. In one embodiment, a feed through 24C is molded or inserted into a second opening 24B within the interior of connector housing 14. The conductors 30 are then soldered or otherwise attached to the feed through pins of feed through 24C. Electrical conductors 25C are then connected between pins on the other side of the feed through 24C and ribbons 25A, 25B. It will be understood by those of ordinary skill in the art that conductors 30 may include optical fibers instead of or in addition to electrical conductors.

Figure 4:
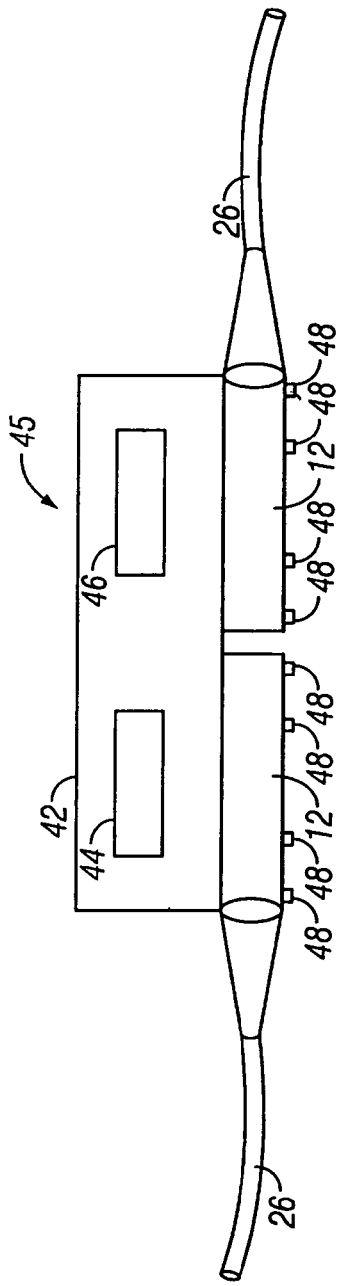
FIG. 4 shows an example embodiment of two connectors as in FIG. 1 coupled to a seismic sensor or signal processing module.

The connector housing 14 may include pre-formed apertures 20 that extend through connector housing 14 to enable cap screws (not shown in FIG. 1) or the like to removably affix the connector 12 to a signal processing module (FIG. 4) or seismic sensor module (FIG. 4). Interior space 18 may include support pins 23 for retaining electrical contact ribbons 25A, 25B. The contact ribbons 25A, 25B may be used to provide electrical contact between the electrical conductors 30 and electrical contact pins 36. As stated above electrical conductors 25C extend between pins of feed through 24C to the contact ribbons 25A, 25B, and electrical conductors 25D then extend from the ribbons 25A, 25B to electrical contact pins 36. Because the contact ribbons 25A, 25B are supported on the support pins 23, axial stress that may be communicated through the cable 26 to the electrical conductors 30 is isolated from electrical contact pins 36. Stopping further communication of axial stress may reduce incidence of electrical contact failure between the conductors 30 and the contact pins 36, and may reduce incidence of short circuits between the contact pins 36. The contact ribbons 25A, 25B may be spaced apart in three dimensions, in the form of layers to provide electrical isolation between the ribbons. Later, in the formation of the connector 12, as will be explained below, potting compound is inserted into the housing 14. The potting compound will effectively electrically isolate the contact ribbons 25A, 25B from each other.

FIG. 1A shows an expanded view of the internal components of the connector 12 so that the arrangement of the contact ribbons can be better understood. As explained above with reference to FIG. 1, the contact ribbons may be engaged with support pins 23 molded as part of the connector housing 14. In the present embodiment, contact ribbons may be seated on the support pins, displaced one from the other, as shown by upper contact ribbons 25A supported above lower contact ribbons 25B. Vertical spacing between the contact ribbons 25A, 25B during assembly may be maintained, for example, by having a taper or similar diametric feature molded into the support pins 23, and having correspondingly sized openings in the contact ribbons 25A, 25B such that the lower contact ribbons 25B may be seated lower on the support pins 23 than the upper contact ribbons 25A. Electrical contact can be made between the feed through 24C and the contact ribbons 25A, 25B by electrical conductors shown at 25C, and from the ribbons 25A, 25B to the contact pins 36 by conductors 25D. By suitable spatial arrangement of the contact ribbons 25A, 25B and conductors 25C, 25D, the need to separately insulate the ribbons and conductors during assembly of the connector 12 may be eliminated.

In the present embodiment the contact pins 36 can be formed from electrically conductive material such that upon contact with corresponding contact pins in a device (FIG. 4) to be mated to the connector 12, an electrically continuous path is created between the electrical conductors 30 and any device within or coupled to the mating device (FIG. 4). It should be clearly understood that one or more of the contact pins 36 may be any type of optical contact coupling device known in the art for joining two optical conduits.

The contact pins 36 may be molded into a selected portion of the housing 14 during molding thereof such that the contact pins 36 may be placed in engagement with corresponding contact pins (not shown) in a mating portion of the module (FIG. 4). Alternatively, the contact pins 36 may be inserted into suitably formed openings (not shown separately) molded into the connector housing 14 during molding. The term "inserted" as used in connection with the disposition of the contact pins 36 in the housing 14 is meant to include both direct molding and post-molding insertion.

Figure 2:
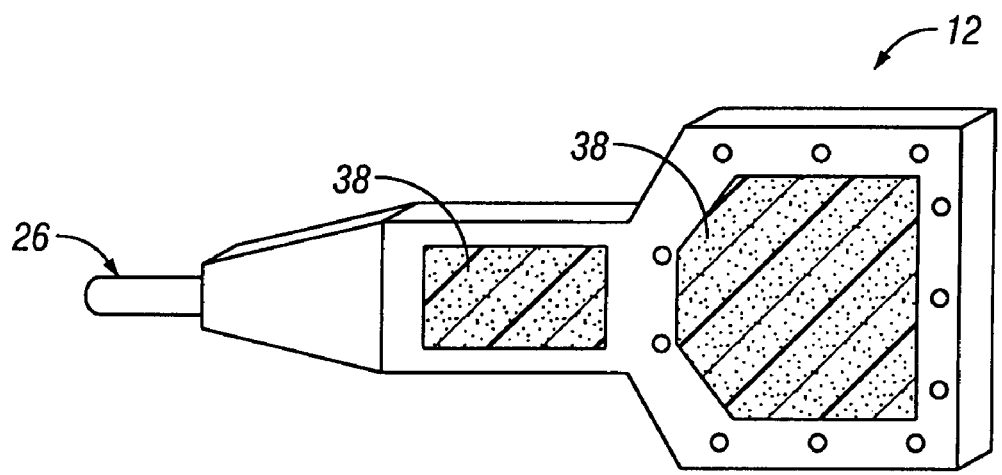
FIG. 2 shows the embodiment of a connector as in FIG. 1 with a cable assembled to the connector.

An example embodiment of a connector according to the invention as coupled to a cable section is shown in FIG. 2. The connector 12 is shown having the end of the cable 26, as explained above with reference to FIG. 1, inserted into the aperture therefor. Also as explained above with reference to FIG. 1, the conductors (30 in FIG. 1) are electrically coupled to the contact ribbons (25A, 25B in FIGS. 1 and 1A).

In FIG. 2, internal spaces 16 and 18 and opening 24A in the connector housing 14 are filled with a curable potting compound 38. In the present embodiment, the curable potting compound 38 can be a polyurethane composition such as the composition sold under the trade name SMOOTH-CAST 320, by Smooth-On, Easton, Pa. The exact composition of the potting compound is not a limitation on the scope of the invention, however, it is important that the composition of potting compound used in any particular embodiment of a connector has the property of forming essentially a molecular or interface-free bond with the material used to form the connector housing (14 in FIG. 1) and with the material used for the cable jacket (28 in FIG. 1). When assembled as shown in FIGS. 1, 1A and 2, and using materials such as suggested above, the assembled connector and cable, as shown in FIG. 2, will be substantially impervious to entry of fluid into the connector 12, as well as substantially impervious to entry of fluid into the interior of the cable 26. A connector thus made as explained with reference to FIGS. 1, 1A and 2 may be submerged in water to modest depths (up to about 100 meters) without damaging the electrical properties of the cable 26 and connector 12. Even in the event the connector 12 becomes accidentally disconnected from a corresponding module (explained below with reference to FIG. 4) or mating device when submerged, or is exposed to high atmospheric humidity along with wide temperature variation, the electrical properties of the connector 12 are unlikely to be compromised by such exposure. As will be readily appreciated by those skilled in the art, such climatic conditions are common along the Gulf Coast of the United States and other parts of the world. When the connector housing 14 is filled with potting compound, all of the electrically conductive devices therein, including contact ribbons 25A, 25B and electrical conductors 25C, 25D will be effectively permanently insulated from each other, and permanently spatially separated from each other, thus reducing the possibility of short circuiting or continuity failure. Additionally, curing the potting compound 38 inside the connector housing 14 has the effect of trapping the strength member 32, such that substantially all axial loading on the connector 12 is transferred to the strength member 32.

Figure 3:
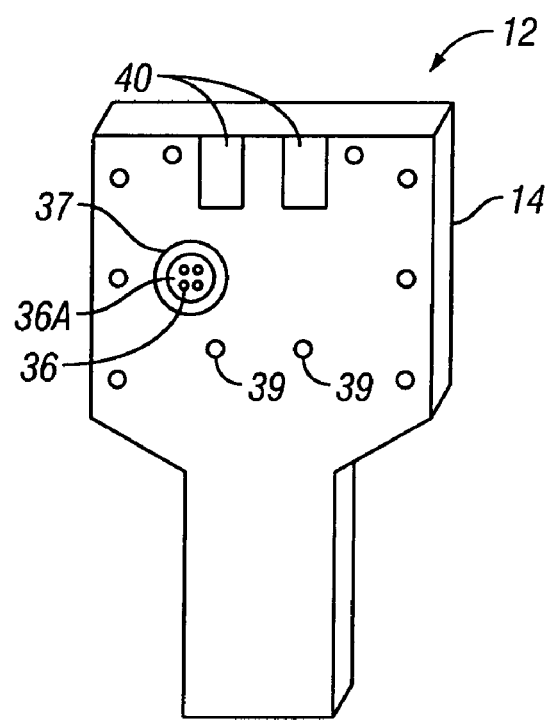
FIG. 3 shows a view of one side of the connector of FIG. 1.

FIGS. 1 and 2 show a bottom view of the connector. The top of the connector 12 is shown in FIG. 3. In the present embodiment, the connector housing 14 may include one or more alignment pins 39 molded therein to facilitate alignment of the connector 12 with mating receptacles in a mounting surface of a housing module (explained below with reference to FIG. 4), and to transfer axial force from the connector 12 to the module (module 45 in FIG. 4). The present embodiment may include two electrical shield or ground contacts 40 which may electrically couple to an exterior portion of the module 45, and where appropriate, to a shield or ground conductor (not shown) in the cable (26 in FIG. 1). Because the module 45 itself is typically designed to be submerged in shallow water, there is no need to isolate the ground contacts 40 from external fluid exposure. The contact pins 36 may be disposed inside a cylindrical or other suitably shaped protective enclosure 36A, which may be formed as part of the molding of the connector housing 14. The enclosure may fit inside a mating receptacle in the housing for module 45. In the present embodiment, the enclosure 36A may be sealed against entry of fluid by an o-ring 37 disposed in a suitable groove or channel formed in the surface of the connector housing 14. The o-ring 37 is energized by compression between the connector housing 14 and a mating surface of the module 45.

FIG. 4 shows one configuration of a seismic sensor and/or signal processing module 45. The module 45 may include one or more seismic sensors 46 such as geophones or accelerometers, disposed inside a housing 42. In addition or alternatively, the housing may include signal processing and telemetry circuits 44 of types well known in the art for receiving electrical signals from seismic sensors and conditioning such signals and formatting them for inclusion in any telemetry format known in the art.

In the embodiment of FIG. 4, two of the connectors 12 as explained above with reference to FIGS. 1, 1A, 2 and 3 are coupled to a mating part of the module housing 42 using cap screws 48 or the like. Various configurations of a seismic data acquisition system may include different numbers of, arrangements of, and components within, the various modules 45, and cable/connector assemblies coupled thereto.

Figure 5:
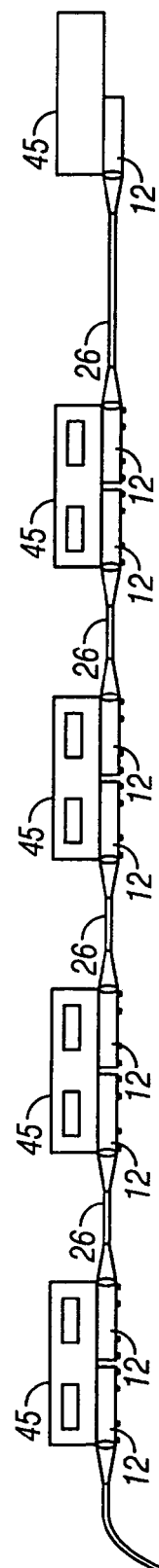
FIG. 5 shows an example seismic data acquisition system using modules, cables and connectors as shown in FIGS. 1 through 4.

An example seismic data acquisition system using cables and connectors, as explained above with reference to FIGS. 1, 1A and 2, and modules, as explained above with reference to FIG. 4, is shown schematically in FIG. 5. A plurality of seismic sensor and/or signal processing modules 45 is shown connected end-to-end using cables 26 each of which is terminated at each end by a connector 12 substantially as explained with reference to FIGS. 1 and 2. In the present embodiment, the modules 45 can have seismic sensors (46 in FIG. 4) and/or signal processing and telemetry circuits (44 in FIG. 4). The endmost cable 26 is coupled to a seismic data recording unit 50 of types well known in the art. The particular arrangement of modules and cables shown in FIG. 5 is only one example of a configuration of cables, connectors and modules using connectors according to the invention. Other configurations of cables and modules which make use of the connector according to the invention are also within the scope of this invention.

Cables and connectors made according to the various aspects of the invention may have improved reliability of electrical continuity and insulation, improved resistance to fluid contamination, and reduced incidence of failure upon unintended uncoupling of cables from associated modules when submerged in liquid or exposed to a humid atmosphere.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A connector and cable combination, comprising:
a molded plastic connector body; the connector body having molded therein at least one contact for mating with a corresponding contact in a device to be coupled to the connector, the connector body having therein an internal opening, the connector body having a mating surface adapted to contact a corresponding mating surface on the device; and
a cable disposed inside the internal opening, the cable having at least one of an insulated electrical conductor and an optical fiber, and a jacket disposed externally to the at least one of the conductor and the fiber, a composition of the jacket and a composition of the connector body selected such that the jacket and the connector body form a substantially interface free bond to a curable potting compound upon cure thereof, the curable potting compound filling the internal opening after insertion of the cable therein, the cable including at least one electrical conductor and the at least one contact including an electrical contact, the combination further comprising at least one electrical contact ribbon disposed within the internal opening and being electrically connected between the at least one electrical conductor and the at least one electrical contact, the contact ribbon supported within the opening such that axial strain on the at least one electrical conductor is substantially prevented from being communicated to the at least one electrical contact.

2. The combination of claim 1 wherein the composition of the jacket and the connector body comprises thermoplastic polyurethane.

3. The combination of claim 1 wherein the cable includes a strength member disposed internally to the jacket, the strength member comprising woven fiber braid.

4. The combination of claim 1 wherein the potting compound comprises polyurethane.

5. A connector and cable combination, comprising:
a molded plastic connector body; the connector body having molded therein at least one contact for mating with a corresponding contact in a device to be coupled to the connector, the connector body having therein an internal opening, the connector body having a mating surface adapted to contact a corresponding mating surface on the device;
a cable disposed inside the internal opening, the cable having at least one of an insulated electrical conductor and an optical fiber, and a jacket disposed externally to the at least one of the insulated electrical conductor and the fiber; and
a curable potting compound filling the internal opening, a composition of the jacket, a composition of the potting compound and a composition of the connector body selected such that the jacket and the connector body form a substantially interface free bond to the curable potting compound upon cure thereof.

6. The combination of claim 5 wherein the composition of the jacket and the connector body comprises thermoplastic polyurethane.

7. The combination of claim 5 wherein the cable includes a strength member disposed internally to the jacket, the strength member comprising woven fiber braid.

8. The combination of claim 5 wherein the cable includes at least one electrical conductor and the at least one contact includes an electrical contact, the combination further comprising at least one electrical contact ribbon disposed within the internal opening and being electrically connected between the at least one electrical conductor and the at least one electrical contact, the contact ribbon supported within the opening such that axial strain on the at least one electrical conductor is substantially prevented from being communicated to the at least one electrical contact.

9. The combination of claim 5 wherein the potting compound comprises polyurethane.

* * * * *